US010873776B2

(12) United States Patent
Haberman et al.

(10) Patent No.: US 10,873,776 B2
(45) Date of Patent: Dec. 22, 2020

(54) FREQUENCY CAPPING OF ADDRESSABLE CONTENT

(71) Applicant: Visible World, LLC, Philadelphia, PA (US)

(72) Inventors: Seth Haberman, New York, NY (US); Claudio Marcus, Andover, NH (US); Robert Bress, Springfield, NJ (US)

(73) Assignee: Visible World, LLC, Philadelphia, PA (US)

( * ) Notice: Subject to any disclaimer, the term of this patent is extended or adjusted under 35 U.S.C. 154(b) by 0 days.

(21) Appl. No.: 13/738,344

(22) Filed: Jan. 10, 2013

(65) Prior Publication Data

US 2013/0179913 A1 Jul. 11, 2013

Related U.S. Application Data

(60) Provisional application No. 61/585,002, filed on Jan. 10, 2012.

(51) Int. Cl.
*H04N 21/2668* (2011.01)
*H04N 21/24* (2011.01)

(52) U.S. Cl.
CPC ......... *H04N 21/24* (2013.01); *H04N 21/2668* (2013.01)

(58) Field of Classification Search
CPC ................... H04N 21/23424; H04N 21/26241
USPC .......................................................... 725/14
See application file for complete search history.

(56) References Cited

U.S. PATENT DOCUMENTS

| 6,163,272 | A | 12/2000 | Goode et al. |
| 2003/0124973 | A1 | 7/2003 | Sie et al. |
| 2004/0088363 | A1 | 5/2004 | Doemling et al. |
| 2004/0193488 | A1* | 9/2004 | Khoo ............... H04N 21/25883 705/14.52 |
| 2005/0086110 | A1 | 4/2005 | Haley et al. |
| 2007/0073583 | A1* | 3/2007 | Grouf et al. .................... 705/14 |
| 2007/0219859 | A1* | 9/2007 | Huntington .................... 705/14 |

(Continued)

FOREIGN PATENT DOCUMENTS

| JP | H0983991 A | 3/1997 |
| JP | 2002366833 A | 12/2002 |
| JP | 2003-067290 | 3/2003 |

OTHER PUBLICATIONS

International Search Report and Written Opinion of the International Searching Authority, dated Apr. 2, 2013, from counterpart international application PCT/US13/20972, International Filing Date Jan. 10, 2013.

(Continued)

*Primary Examiner* — Junior O Mendoza
(74) *Attorney, Agent, or Firm* — BakerHostetler

(57) ABSTRACT

Systems and methods for frequency capping of content are described herein. For example, frequency cap information may be configured to indicate a content exposure limit for a content presentation. The number of exposures to the content presentation at a particular household may be monitored. If the number of exposures is equal to or greater than the content exposure limit, the content may be prevented from being presented to the household. The frequency cap information may be used alone or in combination with other information, such as household demographic, timeframe, and day-part information.

20 Claims, 5 Drawing Sheets

(56) References Cited

U.S. PATENT DOCUMENTS

| | | | |
|---|---|---|---|
| 2008/0254889 A1* | 10/2008 | Sispoidis | G06Q 30/02 463/42 |
| 2009/0150918 A1* | 6/2009 | Wu | H04N 7/173 725/9 |
| 2009/0222351 A1* | 9/2009 | Wang | G06Q 30/02 705/14.68 |
| 2010/0250348 A1* | 9/2010 | Dunbar | 705/14.4 |
| 2010/0303447 A1 | 12/2010 | Niemeijer et al. | |
| 2010/0318418 A1 | 12/2010 | Wertheimer et al. | |
| 2011/0082755 A1* | 4/2011 | Itzhak | G06Q 30/02 705/14.69 |
| 2012/0096489 A1* | 4/2012 | Shkedi | H04N 21/4532 725/34 |
| 2013/0185749 A1* | 7/2013 | Bill | 725/32 |
| 2015/0296239 A1* | 10/2015 | Burger | H04N 21/4223 725/12 |

OTHER PUBLICATIONS

Extended European Search Report and European Search Opinion, dated Aug. 12, 2015, from corresponding European Patent Application No. 13736399.0.

* cited by examiner

| Date/Time | Network | Length | Commercial | Impressions Count = 1 | Avg Viewed Count = 1 | Impressions Count = 2 | Avg Viewed Count = 2 | Impressions Count = 3 | Avg Viewed Count = 3 | Impressions Count = 4 | Avg Viewed Count = 4 |
|---|---|---|---|---|---|---|---|---|---|---|---|
| 01/10/2013 10:05 | CH 10 | 30 | ISCI | 11 | 28.92 | 19 | 29.85 | 13 | 29.63 | 22 | 28.32 |
| 01/09/2013 13:50 | CH 4 | 30 | ISCI | 23 | 29.65 | 21 | 28.65 | 33 | 28.54 | 31 | 28.56 |

FIG. 4

FREQUENCY CAPPING OF ADDRESSABLE CONTENT

CROSS REFERENCE TO RELATED APPLICATIONS

This application claims the benefit of U.S. Provisional Application No. 61/585,002, filed on Jan. 10, 2012, the contents of which are incorporated by reference in their entirety as if fully set forth herein.

FIELD OF INVENTION

The present invention generally relates to frequency capping of addressable content, and more specifically to monitoring and controlling the frequency of addressable content presented to targeted viewers over a network and/or broadcast system.

BACKGROUND

The amount of content that the general public views, downloads, records, or otherwise consumes on a daily basis continues to expand at a rapid pace. Reasons for the growth include advances in technology that allow users to access content in more locations, increased content choices, and better user experiences, such as high definition television programs and digital video recording. Increased content interaction presents opportunities for content producers, such as advertisers and entertainment service providers, to provide more content to more viewers.

However, advances in technology also allow users to have more control over the content that they are exposed to as they view television programs, play games, and otherwise interact with content. In addition, current technology produces a fractured audience that does not consume content as evenly distributed as past audiences. As such, content providers are also challenged by a consuming public that is more uneven, sophisticated and susceptible to content fatigue.

The effectiveness of messages, entertainment programming, and advertising is often related to the amount of exposure to viewers. Once a content offering reaches a certain level of exposure, the value of presenting the content diminishes, sometimes dramatically. Current systems for transmitting content are capable of limited targeting of content to potential viewers, for example, based on a restrictive set of demographic information. As such, they are not able to provide adequate information to content providers about the value of their content presentations, such as audience exposure to content offerings, during the life span of the content.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, an addressable content system configured for frequency capping of content exposure may comprise a processor and a non-transitory, computer-readable storage medium in operable communication with the processor. The computer-readable storage medium may contain one or more programming instructions that, when executed, cause the processor to: receive frequency cap information associated with content configured to be addressed to at least one content receiver, the frequency cap information configured to indicate a content exposure limit; receive content exposure information associated with the at least one content receiver, the content exposure information configured to indicate a number of exposures to the content at the at least one content receiver; and prevent presentation of the content at the at least one content receiver responsive to the number of exposures being equal to or greater than the content exposure limit.

In an embodiment, a computer-implemented method for frequency capping of content exposure may comprise providing a processor configured to receive frequency cap information associated with content configured to be addressed to at least one content receiver, the frequency cap information configured to indicate a content exposure limit. The processor may further operate to receive content exposure information associated with the at least one content receiver, the content exposure information configured to indicate a number of exposures to the content at the at least one content receiver. The presentation of content may be prevented, by the processor, at the at least one content receiver responsive to the number of exposures being equal to or greater than the content exposure limit.

BRIEF DESCRIPTION OF THE FIGURES

FIG. 4 depicts illustrative reporting information for an addressable content system according to some embodiments.

DETAILED DESCRIPTION

Figure 1:
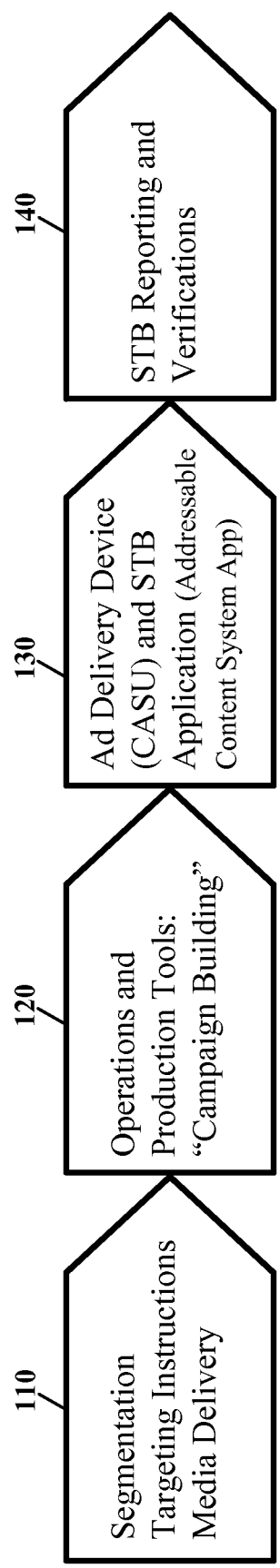
FIG. 1 depicts illustrative operational aspects of an example addressable content system.

The following terms shall have, for the purposes of this application, the respective meanings set forth below.

An "addressable content system" refers generally to a system configured to address content to one or more targets. Content may include advertisement or entertainment content comprising video, audio, graphical, and/or animated content. A target may include cable and/or other definable network media recipients, such as recipients associated with a cable television network or Internet service provider (ISP). One example of a recipient is a physical target within a network, including, without limitation, individual network (e.g., cable network) subscribing households, individual set-top boxes (STBs) and/or other end-points of a media transmission. Other examples of recipients include various types of definable elements, including, but not limited to, ad-insertion zones, physical regions, programs, periods of the day, real-time conditionals, and combinations thereof. Addressing content to a target may be implemented using various methods, including ad insertion by Addressable Inventory Partners, defined below.

"Household addressable" refers generally to the ability to target content to one or more household segments. An addressable content system may include information associated with the segmentation of the targeted recipients, for example, segmented into one or more "segmentation sets," as defined below. An addressable content system and/or the content itself may be referred to as household addressable if it is capable of being targeted to one or more segmentation sets.

A "segmentation set" refers to a category of segmentation applied across recipients, such as addressable households. For instance, a set may be segmented based on certain demographic information, including, without limitation, age, gender, occupation, years of home ownership, household size, income, geographic location, family size, media consumption habits, and combinations thereof. As such, content may be targeted to particular recipients (e.g., households) belonging to one or more segments, such as males between the ages of 25 to 35 with yearly incomes above $35,000.

A "frequency cap" refers generally to the ability to monitor the frequency of exposure of content and to control whether a content exposure is made available to a target based on, among other things, the number of times the target has been exposed to the content. Exposure to content may occur in various ways, including viewing (e.g., a television commercial, website or application banner advertisement), listening (e.g., radio or online audio content), downloading, playing (e.g., a game), receiving (e.g., receiving the content but not actually viewing, etc.). For example, a frequency cap may be associated with addressable inventory to control whether an advertisement exposure is made available to one or more dynamic household segments based on the number of times the one or more dynamic household segments have been exposed to any specific content associated with the advertisement.

An "addressable inventory partner" refers generally to a system, architecture, entity, or other organization wherein an addressable content system may be deployed. For example, an addressable inventory partner may be a cable television network provider, such as a multiple system operator (MSO), an ISP, and/or a computing device advertising system (e.g., advertising systems for mobile device applications, commonly referred to as "mobile apps" or "apps").

A "campaign" refers generally to a series of content presentations (e.g., "creatives") generally related by a common idea or theme. An illustrative campaign is an advertising campaign comprising various advertisements involving a common product or service. Advertisers may have several campaigns running simultaneously. Each campaign is often multiple weeks in length, for which advertisers' creatives, targeting, and daily budget often change. A media buyer may purchase a large set of inventory (e.g., time slots on a television station, display elements, such as a banner advertisement, on a web page, etc.) and decide on a daily basis how to map all of the campaign content product onto the purchased inventory.

A "campaign type" refers generally to a focus of a campaign. For example, one focus of a campaign may be use of household addressable content, which may be referred to as an "HH" campaign herein. An HH campaign may involve campaigns that use addressable inventory to deliver advertisements and other content to one or more pre-defined household segments. In another example, a campaign may focus on frequency cap capabilities, which may be referred to herein as an "FC" campaign. An FC campaign may involve a campaign using addressable inventory to control whether an ad exposure is made available to dynamic household segments, for instance, defined by the number of times they have been exposed to a specific advertisement. A campaign may be configured as an HH campaign, an FC campaign, or a combination thereof.

A "household media package" refers to a set of conditioned creatives and targeting instructions delivered by an addressable content system to a deployed market (e.g., a network wherein the addressable content system is operating). A household media package may contain many content providers, such as advertisers, and refer to one or more segmentation sets.

A "dynamic household media package" refers generally to a delivered package containing media and instructions for presentation on addressable inventory of an addressable inventory partner. Segmentation sets may then be delivered separately out-of-band. A dynamic household media package can work with segmentation sets through various processes. A first example is "fixed single segmentation," which may refer to a process wherein all insertions use a single consistent fixed segmentation (e.g., household income). A second example is "fixed multiple segmentation," wherein all insertions use one of a list of consistent fixed segmentations (e.g., one insertion uses a household income segment, a second insertion uses a third-party segmentation platform, such as the Nielsen Prizm® segmentation platform, etc.). A third example is "dynamic segmentation," wherein a single insertion may use multiple segmentations at once. A non-limiting example provides that some STB's may use income-based segments, other STBs may be configured to use pre-defined segmentation systems (e.g., Nielsen Prizm®), and/or other STBs may receive content based on a combination of segments. A fourth example is "frequency count segments," which refers to a process wherein insertions associated with a FC campaign may be subject to rules, such as the "frequency capping rules," defined below, based on the number of times a target has been exposed to some or all of the content. In the frequency count segments process, each target may be dynamically allocated a corresponding frequency count segment based on the number of times they have been exposed to a given creative. Various factors may be used in combination with the frequency count segment, such as exposure associated with a particular time frame (e.g., time-of-day, during a particular program, adjacent to certain other content presentations, etc.) or day-part (e.g., morning, afternoon, primetime, etc.).

"Frequency Capping Rules" refer to a set of frequency capping instructions delivered by a media network (e.g., cable television network MSO) or addressable content system to a deployed market. The frequency capping rules may include information associated with various content providers (e.g., advertisers, entertainment service providers, etc.) and may refer to various elements, including, without limitation, specific campaigns, content, content specific frequency cap levels, and/or options to limit campaign or content frequency of exposure associated with a particular timeframe or day-part. The frequency capping rules may specify, among other things, limits on the number of exposures of certain creatives.

"Message sequencing rules" refer generally to a set of message sequencing instructions delivered by a media network or addressable content system to a deployed market. The message sequencing rules may be associated with various content providers (e.g., advertisers) and may refer to the sequencing of content. For instance, the message sequencing rules may comprise information associated with the sequencing of advertisement content within a campaign, relating to the overall campaign and/or frequency cap levels, such as content, timeframe and/or day-part frequency cap levels. For example, for the purpose of extending the storyline of a campaign, an advertiser may want commercial A to be presented no more than 10 times per household, and then to be followed by presenting commercial B no more than 5 times to per household.

"Impression edit rules" refer generally to one or more methods of filtering out content impression data to remove potential false positives. The impression edit rules may comprise one or more methods agreed upon by participants, such as a network and an addressable content system operating therein. A non-limiting example provides that an advertisement event may be recorded if the STB is tuned to a network on which an addressable advertisement is scheduled at least 8 seconds prior to the advertisement break (e.g., for the purposes of receiving the addressable advertisement trigger). If the STB is tuned to the addressable advertisement for at least 1 second, an ad impression event may be recorded. For reporting purposes, such as reporting events to network operators, the addressable content system may be configured to filter out impression records when there has been no other activity on that STB for a specified period of time. For example, if an advertisement event occurs but the STB has had no other activity for a period of at least 3 hours, the advertisement event may be considered invalid. Impression edit rules may be applied according to various methods. For example, impression edit rules may be applied according to last user activity (LUA) timestamp information. A non-limiting example provides that each STB-level record may include a record of the LUA, such as the last interaction. Interactions with a STB (or other content receiver) may include channel change, volume change, guide access, etc. Using the timestamp of the impression and the LUA, impression edit rules may be used to remove impressions where it appears likely that the viewer is not interacting with the content receiver (e.g., STB off, TV on/off).

A "segmentation file" refers generally to a file comprising information associated with a target. The information may include, without limitation, target addresses and recipient profiles (e.g., "segmentation flags") and/or sets thereof (e.g., "segmentation sets"). Target addresses may include various addresses used to address content, such as MAC and IP addresses. A non-limiting example provides that a set of recipient profiles may comprise income, Prizm® clusters, and/or the number of times a segment has been exposed to one or more creatives (e.g., a television commercial). Segmentation sets, such as household addressable segmentation sets, may be generated by various entities, such as the addressable content system, a third-party (e.g., Experian®), or combinations thereof. A segmentation file may be associated with one or more instructions. If the segmentation set has been generated by a third-party, the associated instructions may be delivered to the addressable content system. In one example, frequency cap segmentation sets may be generated directly by the addressable content system.

"Household targeting instructions" refer generally to a set of instructions involving creative-to-air for a particular network, time, and household segment and/or combination of segments. The household targeting instructions may comprise information associated with segmentation sets and which creatives have been delivered to which targets.

A "client advertising serving unit" (CASU) refers generally to a device, combination of devices, and/or software applications configured to control the presentation of addressable ads. A CASU may be configured to stream out addressable content within a network.

A "client profile serving unit" (CPSU) refers generally to a device, combination of devices, and/or software applications configured to manage the delivery of profiles to STBs or other recipient devices and to collect audience measurement information.

The present disclosure generally describes a system for targeting addressable content to recipients based on information associated with the recipients. A recipient may include any physical device or definable element capable of receiving content through a network or other communication system, such as a cable television network, satellite television network, the Internet, an intranet, a LAN, a WAN, computing device advertising systems (e.g., advertisements, such as banner advertisements, provided through mobile device applications), or combinations thereof. Television networks may include standard definition (SD) and high definition (HD) networks. A physical device may include any end-point of media transmission, including a computing device (e.g., a personal computer (PC), laptop computer, and/or mobile computing device, including, without limitation, smart phones, personal digital assistants (PDAs), and tablet computing devices), SD and HD televisions, STBs, and combinations thereof. Definable elements may include, but are not limited to, ad-insertion zones, physical regions, programs, periods of the day, real-time conditionals, and combinations thereof.

Embodiments provide that the addressable content may be managed by an addressable content system configured to receive and analyze information associated with potential recipients (e.g., information that allows for the generation of segmentation sets) and the addressable content (e.g., which segmentation sets are associated with the addressable content and/or the frequency with which recipients have viewed the addressable content). The addressable content system may select addressable content for delivery selected for targets based on various factors, including segmentation sets and frequency capping rules. A non-limiting example provides that an advertisement comprised of addressable content may be targeted for recipients in a particular income- and age-based segment that have received the addressable content, or content related to the addressable content, below a threshold number of times.

In an embodiment, an addressable content system may be configured for level frequency capping of exposures associated with any given content, while not requiring pre-defined target segments or multiple creatives. As such, selection of content to present to a household may depend on the number of times that the household has been exposed to the content, in relation to a specified household level frequency defined for the content. In another embodiment, presentation of the content may additionally be limited by a particular timeframe or day-part.

Illustrative and non-restrictive examples of addressable content systems include addressable advertisement systems developed by Visible World, Inc. of New York, N.Y. These systems provide household addressable platforms designed such that multiple advertising creatives are required for targeted execution against pre-defined segmentation over a fixed time frame. The targeted execution of advertising creatives occurs without consideration as to the number of times that any given household has been exposed to any given advertisement creative or content related to the advertisement creative. For example, typical systems may provide for an advertisement for an expensive car that is shown in households where the profiled segments are above a certain household income, regardless of how many times a qualified household has been exposed to the targeted advertisement. Certain aspects of these systems are illustrated in FIG. 1.

In such systems, segmentation of the targeted audience (e.g., defining the various segments into which the overall audience can be categorized or otherwise described), targeting instructions and media delivery 110 define the first stages of an addressable content system. Operating and production tools 120 are used to build a campaign to reach the targeted audience for various products and services across various platforms, such as cable or satellite television, internet broadcasts, or other distribution channels. Advertisement delivery devices 130 (e.g., CASU) and STB's may operate to provide the hardware devices and execute the software applications through which content can be distributed at the consumer end. Finally, STB and/or CPSU reporting and verifications 140 track and monitor the content distribution and other metrics to provide valuable data reflecting the content's consumption by the end consumer. For example, some embodiments provide reporting and verifications allow the addressable content system to determine whether targeted content was actually consumed (e.g., watched) by the intended recipient.

Previous systems, however, do not take into account the sheer quantity and frequency of the use of a particular advertisement, commercial or other content message. According to these systems, as long as the household, or other defined destination, meets the criteria of the targeted segment, that household may be subjected to unlimited viewing of the same content, without variation. What is needed, therefore, is a system that tracks, monitors and adapts the frequency of content displayed to an end consumer. As described herein, an addressable content system configured according to embodiments may operate to access frequency cap information associated with the frequency of addressable content consumption by recipients and to target addressable content in view of, among other things, the frequency cap information.

Figure 2:
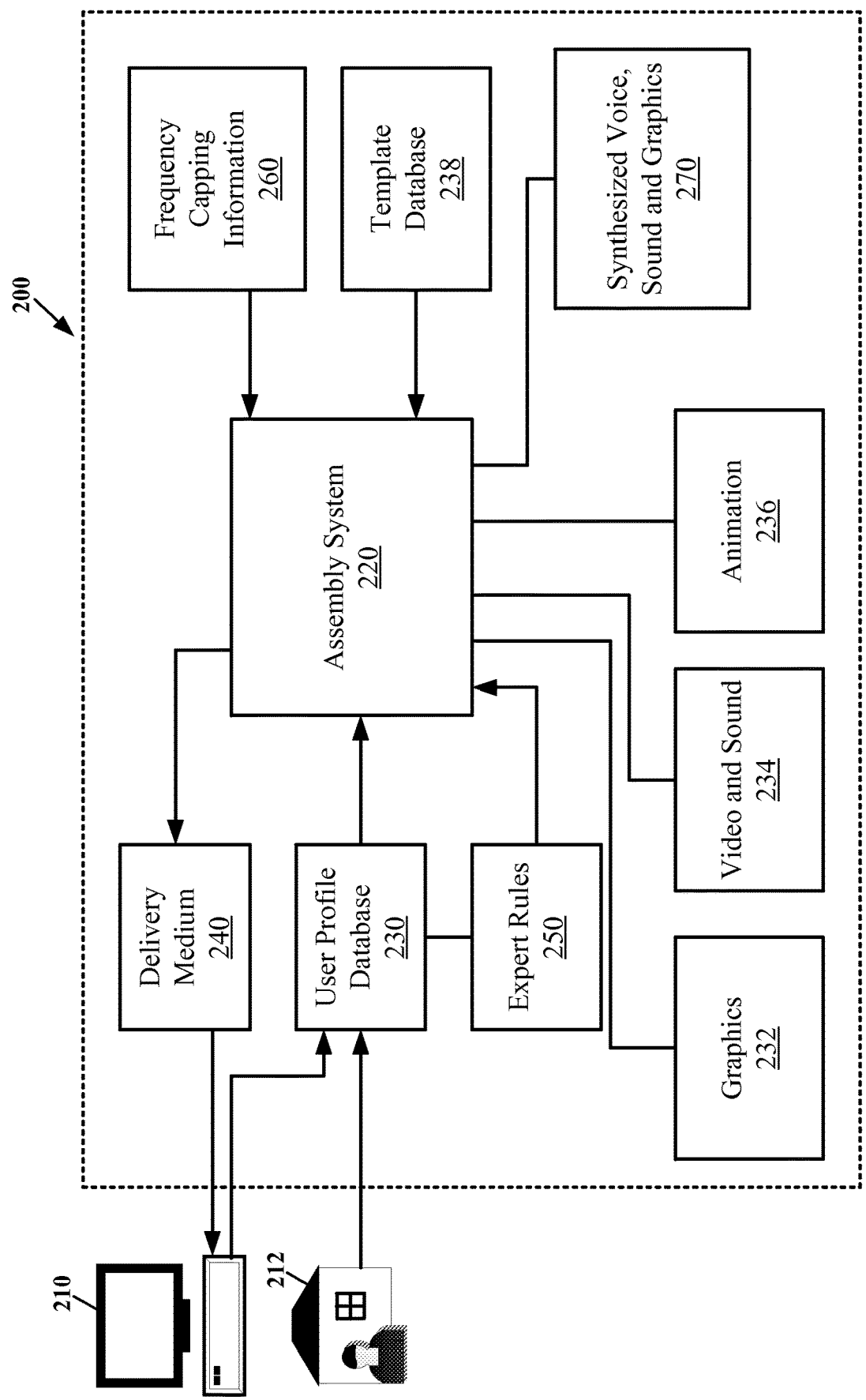
FIG. 2 depicts an illustrative addressable content system according to some embodiments.

FIG. 2 depicts an illustrative addressable content system according to some embodiments. As shown in FIG. 2, an addressable content system 200 may include a user profile database 230 comprising information associated with a target 212. The addressable content system 200 may be implemented in computer hardware, software, and a combination thereof. This user profile database 230 may be in various forms and may comprise one or more collections of information. Non-limiting examples of information stored in the user database 230 includes a proprietary database of information owned by one entity, publicly available information at one or more locations, including information from user interactions on content and/or service provider information, web sites, shopping networks, or self-completed profile information. For example, the database may be a subscriber (e.g., cable television, satellite television and/or ISP) database accessed by the addressable content system 200 on a per-transaction, subscription, or other basis. The user profile database 230 may contain any type of information regarding households 212 or other addressable content recipients, including demographics, address, monetary income, political affiliations, known preferences, buying patterns and any other information capable of being used according to embodiments described herein. The user profile information 230 may be associated with an entire household, individuals associated with the household, or combinations thereof. In an embodiment, the user profile information 230 may be used to generate segmentation segments, segmentation sets, and any other type of segmentation information used by the addressable content system 200.

A template database 238 may be configured to include content templates which reflect the story, message, advertisement, or any other type of content that creator or provider intends to deliver to a household 212. In an embodiment, the message may be configured as a form of campaign, such as a message relating to a product advertisement, political message, or other informative message tailored for each household 212 and/or groups of recipients (e.g., segmentation sets).

One or more resource libraries or databases 232, 234, 236 may be configured to provide media segments used to assemble the content. The databases may include various elements for creating content, such as graphics 232, video and sound segments 234, and animation 236. The elements may comprise electronic files, such as multimedia files, and may be part of a general library of available material (e.g., "stock footage"), such as pictures, animations and/or videos of individual city skylines, attractions, natural scenery for use in backgrounds, and/or people in certain situations (e.g., business meeting). Alternatively, the elements may be generally or specifically created for a certain message campaign. For example, an advertiser may generate several media segments for a specific automobile comprising video and audio of an automobile in different colors driving at different locations. The media segments may be inserted into a template from the template database 238 at an appropriate location to generate an advertisement for delivery to one or more households 212. According to some embodiments, media segments, whether from a library and/or original content, may be generated, configured, selected and/or inserted into a template based on segmentation information, frequency capping information, or combinations thereof.

In addition to the resource libraries 232, 234, 236, the addressable content system 200 may be configured to synthesize additional elements 270 as needed during message creation, thereby providing increased flexibility. Non-restrictive examples of synthesized elements 270 include sound (e.g., synthesized speech, music, background sounds), graphics (e.g., text, pictures), background filler, visual objects (including color variations thereof), and visual effects (e.g., including dissolves, morphing of objects, etc.).

Addressable content messages may be assembled by an assembly module 220. The assembly module 220 may be configured to receive message templates from the template database 238 and to use various media segments from the resource libraries 232, 234, 236 to generate a message. The assembly module 220 may access information associated with one or more target households 212 from the user profile database 230. In an embodiment, the assembly module may also receive expert rules 250, which are configured to interpret the user profile data 230. For example, the expert rules 250 may be configured to direct the assembly module 220 to select particular segments from the resource libraries 232, 234, 236 as elements of the addressable content. According to some embodiments, the expert rules 270 may be configured to interpret user profile data from many different sources and in many different formats. For instance, the expert rules 270 may receive information from a subscriber database (e.g., cable television subscriber address, age, and gender information) and publicly available information (e.g., years of home ownership and home value) to generate decisions and/or assumptions involving a subject household 212. In an embodiment, the expert rules 270 may be configured to generate decisions based on incomplete user profile data (e.g., estimating home income based on home value and age information), for example, providing logical "fallback" selections as necessary.

The addressable content may be encoded for transmission through various delivery mediums 240, including, without limitation, over a cable television network, a satellite television network, and various computing device networks (e.g., Ethernet and/or through the Internet). The encoded addressable content may be delivered to a receiving device 210 at one or more targeted households 212. The receiving device 210 may comprise any type of device capable of receiving the addressable content and presenting it to a user. Non-limiting examples of receiving devices 210 include STBs, HD and SD televisions, computing devices (e.g., personal computer, laptop computer, server, thin client, and/or mobile computing devices, such as smartphones, PDAs, and/or tablet computing devices).

The addressable content may be presented using various methods, such as a display device and/or audio device in operable connection with the receiving device 210. The delivery medium can be any of various types of media, including devices physical delivered to a household (e.g., pre-recorded video tapes, DVDs, CDs) and/or various types of live or substantially live feeds, including, but not limited to, cable systems, Internet connections, satellite links, radio frequency (RF) towers, line RF signals, cell phone networks, and the like. The addressable content system may operate to generate personalized messages to households 212 and/or individuals in real-time based on information in the user profile database 230 and/or output of the expert rules 250. As such, addressable content may be delivered to households 212 based on the particular technology and/or connections associated with the household. For instance, a household 212 associated with a satellite television connection may be targeted with addressable content transmitted through the satellite television network. In another instance, a household 212 with a cable network connection for both cable television and the Internet may be associated with information indicating that individuals in the household prefer to consume content on computing devices connected to the Internet. As such, the addressable content system 200 may be configured to transmit some or all addressable content to this household 212 through an Internet connection.

According to some embodiments, the addressable content system 200 may be configured to assemble addressable content at various locations. For example, the addressable content may be completely assembled (e.g., be assembled for final user consumption) within the addressable content system 200, such as within the assembly module 220. In another embodiment, the various elements of the addressable content may be delivered to the receiving device 210 (e.g., a STB) for assembly prior to presentation to an individual. In this embodiment, the disassembled addressable content may be assembled at the receiving device 210 based on various triggers, such as a cue to present the addressable content, a particular time of day, a particular content slot (e.g., third advertisement slot of the half-time of a football game), or one or more signals from the addressable content system (e.g., a signal to assemble the content, a signal to present the content, etc.). In this manner, the addressable content system 100 may operate to selectively manage resources associated with generating and presenting addressable content to end users.

As shown in FIG. 2, the addressable content system 200 may comprise frequency cap information 260 configured to store information associated with the number of times households 212 have been involved with a particular content presentation. For instance, the frequency cap information 260 may comprise information associated with the number of times a household 212 has been targeted to receive a particular advertising message, the number of time that a household has actually viewed a particular message (or messages having a certain relationship thereto), or combinations thereof. In an embodiment, the frequency cap information 260 may comprise a counter or other element associated with one or more content presentations for tracking exposures thereto. According to some embodiments, the counter may be incremented responsive to each exposure, for instance, by software executed at the receiving device 210, by the addressable content system 200, or a combination thereof. Exposure to content may occur in various ways, including viewing (e.g., a television commercial, website or application banner advertisement), listening (e.g., radio or online audio content), downloading, playing (e.g., a game), receiving (e.g., receiving the content but not actually viewing, etc.).

The addressable content system 200 may use information from the frequency cap information 260 to determine whether to prevent a particular message, campaign, or other content from being exposed to a household 212. In one example, an advertiser may specify that households 212 should view a particular message only a limited number of times. For instance, limiting exposure may operate to prevent message over-saturation or to maintain an effectiveness of an advertising campaign. In another example, a content provider (e.g., entertainment services provider) may specify that a household 212 should not receive a third message until either of a first or second message has been received and viewed at the receiving device 210.

According to some embodiments, if a household 212 has reached the exposure limit for a particular content presentation, the addressable content system 200 may prevent the household 212 from being exposed to the content presentation again. Prevention of exposure may be performed by any process capable of inhibiting a household 212 from being exposed to the content more than the exposure limit, including, without limitation, sending the content presentation to the household, preventing the content presentation from being accessed (e.g., opened, viewed, etc.) at the household, exchanging the content presentation with other content that has not reached the limit, and combinations thereof.

In one embodiment, the addressable content system 200 may use only the frequency cap information 260 to determine whether to expose a household 212 to certain content. In another embodiment, the addressable content system 200 may use the frequency cap information 260 in combination with other information (e.g., user profile database 230, expert rules 250, time frame, day-part, etc.), when determining whether to expose a household 212 to certain content. According to some embodiments, the frequency cap information 260 may be configured to determine levels of exposure in relation to certain information. For example, content relating to weather (e.g., snow tire advertisements), may have exposure limits dynamically and automatically adjusted based on the weather (e.g., heavy snowfall may increase exposure limits). In another example, an exposure limit may be configured on a sliding scale based on certain information or viewer actions. In this example, the exposure limit may be tied to the amount of time a viewer is interacting with a content receiver. For instance, if a household is viewing a large amount of television over the duration of a content campaign, the exposure limit may be increased.

In an embodiment, the frequency cap information 260 may be populated with information obtained by the addressable content system 200 from households 212 receiving addressable content. For example, a receiving device 210, such as a STB may be configured to store, maintain, and/or transmit information associated with content accessed therewith. As such, if a user consumes addressable content, the addressable content system 200 may transmit the information into the frequency capping information 260 for use by the assembly module 220 or other components of the addressable content system. For instance, the expert rules 250 may use the frequency capping information 260 to generate certain decisions. In one example, the expert rules 250 may determine that certain types of addressable content (e.g., automobile-related advertisements) have a higher consumption rate (e.g., (number of times transmitted)/(number of times viewed) that other types of addressable content (e.g., food-related advertisements).

Figure 3:
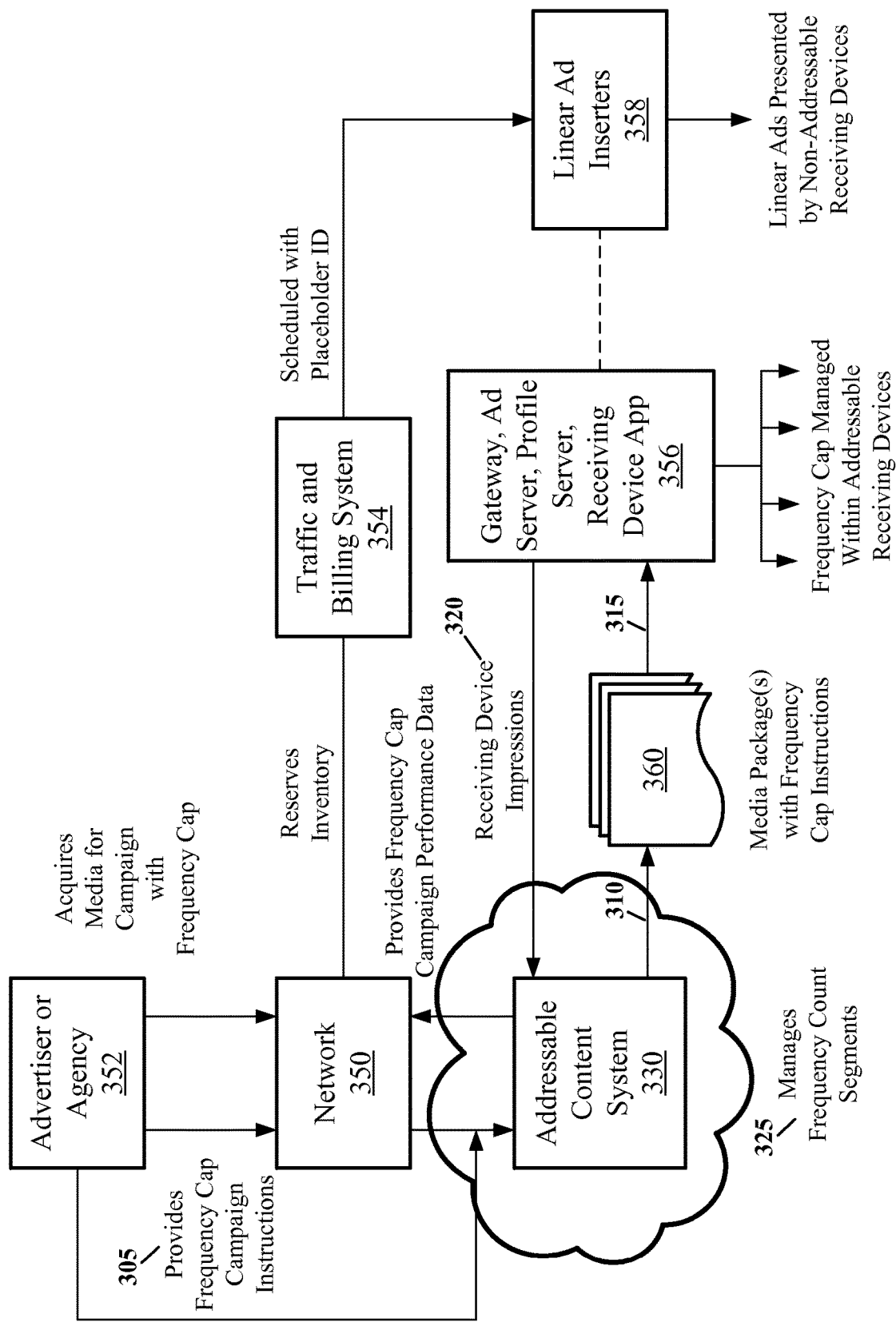
FIG. 3 depicts a flow diagram for an illustrative method of frequency capping addressable content according to an embodiment.

FIG. 3 depicts a flow diagram for an illustrative method of frequency capping addressable content according to an embodiment. As shown in FIG. 3, an addressable inventory partner 350 may configure a household addressable campaign and submit campaign information and rules to the addressable content system 330 in advance of scheduled airing 305. The addressable inventory partner 350 may comprise a network, such as a cable television network. The household addressable campaign may be associated with one or more entities, such as an advertiser or agency 352 and/or the addressable inventory partner 350.

In order to frequency cap the addressable content, the rules will comprise frequency cap information. For example, the frequency cap information may comprise household frequency cap levels for the campaign and/or specific advertisements, such as limiting certain advertisements to 5 viewings. The frequency cap information and/or other rules may comprise options to limit the campaign and/or specific advertisements relative to other characteristics, such as timeframes and day-parts.

The addressable content system 330 may deliver 310 the household media package to a CASU 360. The CASU 360 may be configured to include the frequency cap instructions. Frequency count segment information (e.g., the number of times a household has been exposed to an advertisement) is not necessary to initiate the campaign as households have not been exposed yet to the campaign. Targeted content receivers (e.g., STBs) see the addressable content based on CASU signaling and pre-defined segmentation responsive to each addressable assertion 315. One or more hardware devices and/or software applications 356 may be configured to facilitate the delivery and/or insertion of addressable content. Illustrative hardware devices and/or software applications 356 include addressable content system gateways, content servers (e.g., advertising servers), information servers (e.g., user profile servers), and various software applications, such as STB control applications.

Frequency cap and other information associated with content receiver addressable content data may be collected by the addressable content system 320. For example, the addressable content system may receive information associated with which receiving units were targeted for particular addressable content and/or which receiving units actually presented the addressable content (e.g., which receiving units were actually active and viewing the addressable content). The information associated with the content receiver may be collected at various times, such as hourly or daily.

Impression data is used by the addressable content system to recalculate household level frequency of exposure to any give addressable content 325. Household level frequency of exposure may be calculated based on various factors, including, without limitation, timeframe, day-part, segmentation set, and combinations thereof. Households may then be associated automatically with frequency count segments defined by the household level frequency of exposure to any given ad and/or timeframe or day-part. The addressable content system may be configured to deliver an updated household media package to CASU 360, for example, containing the updated frequency count segments. The addressable content system 330 may operate to delivery addressable content to targeted receivers based on the frequency cap information. For example, an advertisement may be targeted for delivery to a particular segmentation set that has viewed the advertisement less than 10 times. Non-addressable content receivers 358 may be provided with linear advertisements delivered without regard to profile and/or frequency cap information.

The addressable content system 330 may be configured to transmit certain information pertaining to the addressable content and household consumption thereof back to addressable inventory partner 350 and/or advertiser 352. For instance, the addressable content system 330 may operate to transmit frequency cap campaign performance data configured to indicate the effectiveness of the campaign. The addressable inventory partner 350 may use this information for various purposes, such as to reserve inventory, determine advertising rates, configure future campaigns, and the like through a traffic and billing system 354.

According to embodiments, a campaign may comprise various instructions configured to specify operation thereof. For example, an FC campaign may include instructions comprising information associated with delivery, contents and/or notes/questions. In an embodiment, delivery information may comprise information specifying from where and to whom delivery of the campaign and/or content thereof is supposed to be transmitted. For instance, an FC campaign may be configured such that content is transmitted from an addressable inventory partner to the entity operating the addressable content system for every campaign involving a frequency cap.

The content information may comprise information associated with the content of the campaign and intended recipients. Content information may include geography information (e.g., defined as full footprint or individual zone(s)), network information (e.g., expected network for linear insertion), time window information (e.g., expected window(s) for linear insertion(s)), campaign information (e.g., metadata about the campaign including advertiser, product and media agency), and/or frequency cap rules (e.g., specifies the desired household specific frequency of exposure cap for the campaign or specific advertisements).

The notes/questions information may comprise additional information relevant to operation of the campaign. For example, frequency cap instructions may be included that indicate the desired household level frequency of advertisement exposure for the campaign. Additional information may be associated with a need to determine default advertisement exposure once a household has reached a specified frequency cap. For instance, the frequency cap information may be configured such that the household would then be exposed to an advertisement associated with another frequency cap campaign where the frequency of exposure has yet to reach the desired cap. If no other frequency cap campaign is available, a default spot may be assigned by the addressable inventory partner.

FIG. 4 depicts illustrative addressable content system reporting information according to some embodiments. As shown in FIG. 4, reporting information may include the number of frequency count segments that would correspond to the desired household level of exposure cap. For example, if a frequency cap is set at 7 exposures, then 6 segments would be used to set a frequency count ranging from 1-6.

Illustrative reporting information may include date and time information 405, the network 410 where the insertion aired, the length 415 of the content presentation, and the content name 420 (e.g., commercial name, such as the International Standard Commercial Identifier (ISCI) or Ad-ID name). Certain fields may be represented for each frequency count segment, such as impressions 425 and average viewed 430. Impressions may represent the total number of impressions viewed by a particular frequency count segment, segmentation set, other categories, and combinations thereof. Average views may represent the average number of tune-time across all impressions by a particular frequency count segment, segmentation set, other categories, and combinations thereof.

Figure 5:
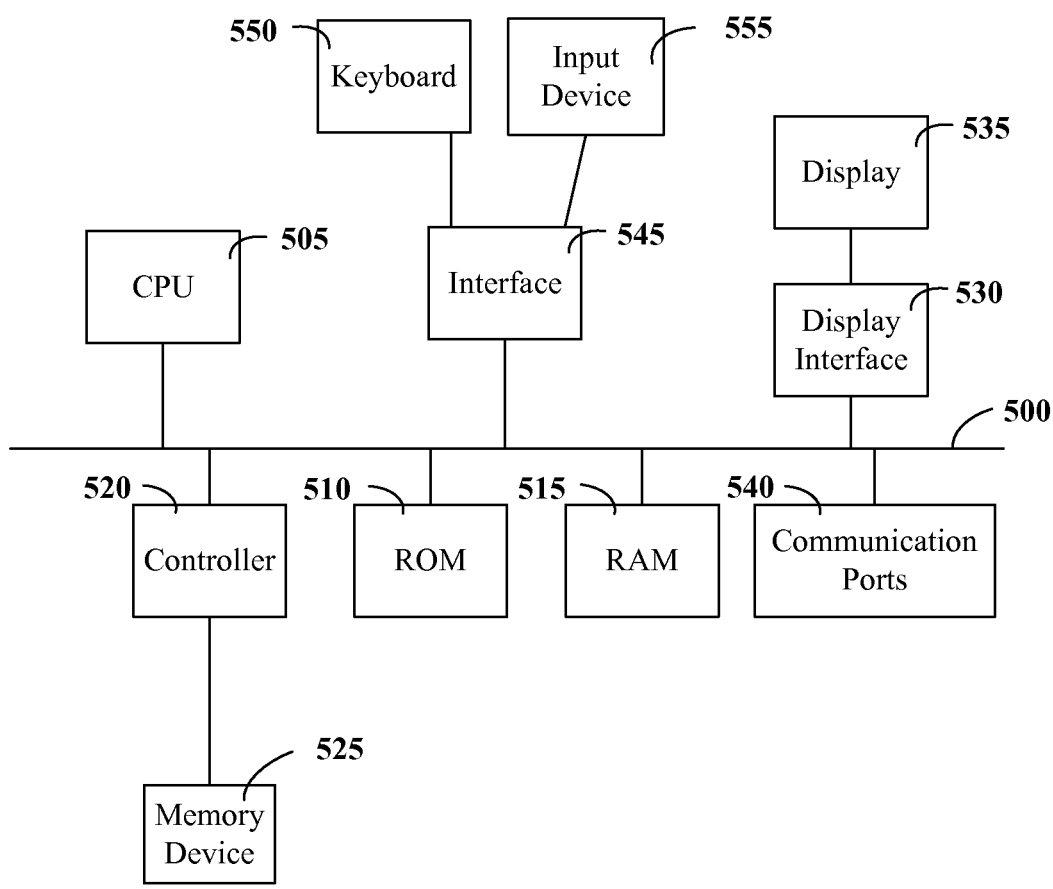
FIG. 5 depicts a block diagram of illustrative internal hardware that may be used to contain or implement program instructions according to an embodiment.

FIG. 5 depicts a block diagram of exemplary internal hardware that may be used to contain or implement program instructions, such as the modules and/or process steps discussed above in reference to FIGS. 2 and 3, according to some embodiments. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 2, is an exemplary processing device, computing device or processor as such terms are using in this disclosure. Read only memory (ROM) 510 and random access memory (RAM) 515 constitute exemplary memory devices.

A controller 520 interfaces with one or more optional memory devices 525 to the system bus 500. These memory devices 525 may include, for example, an external or internal DVD drive, a CD ROM drive, a hard drive, flash memory, a USB drive or the like. As indicated previously, these various drives and controllers are optional devices.

Program instructions, software or interactive modules for providing the digital marketplace and performing analysis on any received feedback may be stored in the ROM 510 and/or the RAM 515. Optionally, the program instructions may be stored on a tangible computer readable medium such as a compact disk, a digital disk, flash memory, a memory card, a USB drive, an optical disc storage medium, such as a Blu-Ray™ disc, and/or other recording medium.

An optional display interface 530 may permit information from the bus 500 to be displayed on the display 535 in audio, visual, graphic or alphanumeric format. Communication with external devices may occur using various communication ports 540. An exemplary communication port 540 may be attached to a communications network, such as the Internet or an intranet. Other exemplary communication ports 540 may comprise a serial port, a RS-232 port, and a RS-485 port.

The hardware may also include an interface 545 which allows for receipt of data from input devices such as a keyboard 550 or other input device 555 such as a mouse, a joystick, a touch screen, a remote control, a pointing device, a video input device, and/or an audio input device.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which alternatives, variations and improvements are also intended to be encompassed by the following claims.

What is claimed is:

1. A system comprising:
a receiver configured to:
receive, from a first computing device, first information indicating a first exposure limit for first content, wherein the first content is associated with a first series of content presentations and is configured to be addressed to a second computing device;
receive, from the second computing device, second information indicating:
a first number of exposures to the first content by the second computing device, and
an amount of time that a user interacted with the second computing device during the first series of content presentations;
receive, from the first computing device, third information indicating a presentation order of second content associated with a second series of content presentations;
a processor configured to determine, based on the second information, a second exposure limit for the second content; and
a transmitter configured to send, to the second computing device, fourth information comprising instructions to cause display of the second content based on the presentation order and such that a second number of exposures is less than or equal to the second exposure limit.

2. The system of claim 1, wherein the first content and second content comprise advertising content.

3. The system of claim 1, wherein the system comprises a cable television system, a satellite television system, or an Internet service provider system.

4. The system of claim 1, wherein the first information comprises demographic information.

5. The system of claim 1, wherein the second exposure limit comprises an increase to the first exposure limit based on the amount of time exceeding a threshold.

6. The system of claim 1, wherein the first computing device comprises a server.

7. The system of claim 1, wherein the second computing device comprises a gateway that is operably coupled to a receiving device.

8. The system of claim 1, wherein the second computing device comprises a set top box that is operably coupled to a receiving device.

9. The system of claim 1, wherein the second computing device comprises a receiving device.

10. The system of claim 1, wherein the fourth information further comprises segmentation information that is sent via an out-of-band signal and wherein the segmentation information comprises demographic information that enables assembly of a personalized version of the second content.

11. A method comprising:
receiving, from a first computing device, first information indicating a first exposure limit for first content, wherein the first content is associated with a first series of content presentations and is configured to be addressed to a second computing device;

receiving, from the second computing device, second information indicating:
a first number of exposures to the first content by the second computing device, and
an amount of time that a user interacted with the second computing device during the first series of content presentations;

receiving, from the first computing device, third information indicating a presentation order of second content associated with a second series of content presentations;

determining, based on the second information, a second exposure limit for the second content; and sending, to the second computing device, fourth information comprising instructions to cause display of the second content based on the presentation order and such that a second number of exposures is less than or equal to the second exposure limit.

12. The method of claim 11, wherein the first content and second content comprise advertising content.

13. The method of claim 11, wherein the first information comprises demographic information.

14. The method of claim 11, wherein the second exposure limit comprises an increase to the first exposure limit based on the amount of time exceeding a threshold.

15. The method of claim 11, wherein the first computing device comprises a server.

16. The method of claim 11, wherein the second computing device comprises a gateway that is operably coupled to a receiving device.

17. The method of claim 11, wherein the second computing device comprises a set top box that is operably coupled to a receiving device.

18. The method of claim 11, wherein the second computing device comprises a receiving device.

19. The method of claim 11, wherein the fourth information comprises segmentation information that is sent via an out-of-band signal and wherein the segmentation information comprises demographic information that enables assembly of a personalized version of the second content.

20. A device comprising:
one or more processors; and
memory storing instructions that, when executed by the one or more processors, cause the device to:
receive, from a first computing device, first information indicating a first exposure limit for first content, wherein the first content is associated with a series of content presentations and is configured to be addressed to a second computing device;
receive, from the second computing device, second information indicating:
a first number of exposures to the first content by the second computing device, and
an amount of time that a user interacted with the second computing device during the first series of content presentations;
receive, from the first computing device, third information indicating a presentation order of second content associated with a second series of content presentations;
determine, based on the second information, a second exposure limit for the second content; and
send, to the second computing device, fourth information comprising instructions to cause display of the second content based on the presentation order and such that a second number of exposures is less than or equal to the second exposure limit.

* * * * *